United States Patent [19]
Skarin et al.

[11] 3,831,780
[45] Aug. 27, 1974

[54] MAGNETIC TRANSFER APPARATUS

[75] Inventors: Carl R. Skarin; Kenneth H. Dietzel, both of Saginaw; Roger J. Gendron, Bridgeport, all of Mich.

[73] Assignee: Baker Perkins Inc., Saginaw, Mich.

[22] Filed: Jan. 12, 1972

[21] Appl. No.: 217,391

[52] U.S. Cl. ............... 214/6 DS, 214/8.5 D, 271/4, 271/193
[51] Int. Cl. ...................... B65g 57/04, B65g 60/00
[58] Field of Search ............ 214/6 DS, 6 FS, 8.5 D, 214/8.5 C, 8.5 A, 8.5 R; 271/4, 18 A, DIG. 2, 3, 5, 6, 7, 193

[56] References Cited
UNITED STATES PATENTS

| | | | |
|---|---|---|---|
| 1,706,533 | 3/1929 | Lorig et al. | 214/8.5 D |
| 2,294,273 | 8/1942 | Buxbaum | 214/8.5 D |
| 2,562,247 | 7/1951 | Van Schie | 214/8.5 C |
| 2,743,923 | 5/1956 | Watter | 271/18 A |
| 3,140,088 | 7/1964 | Sykes | 271/4 |
| 3,404,789 | 10/1968 | Georgeff et al. | 214/8.5 D |
| 3,490,614 | 1/1970 | Wilson et al. | 214/8.5 D |
| 3,512,660 | 5/1970 | Bende | 214/8.5 D |
| 3,517,835 | 6/1970 | Temple | 214/8.5 D |

FOREIGN PATENTS OR APPLICATIONS

| | | | |
|---|---|---|---|
| 266,809 | 9/1964 | Australia | 214/6 DS |

*Primary Examiner*—Robert J. Spar
*Attorney, Agent, or Firm*—Learman & McCulloch

[57] ABSTRACT

Transfer apparatus is provided which is, for example, selectively operable to successively stack or unstack magnetizable pans or like articles. The apparatus includes a vertically movable magnetic field producing pickup member at a pan lifting station for gripping a pan at a lowered position and lifting it to a raised position, a pusher member for engaging and moving the raised pan to strip the raised pan from the pickup member and laterally transfer it to a pan depositing station, a magnetic field producing pan receiving member at the depositing station for receiving the pan, and a stripper member which permits stripping of the raised pan from the receiving member.

16 Claims, 5 Drawing Figures

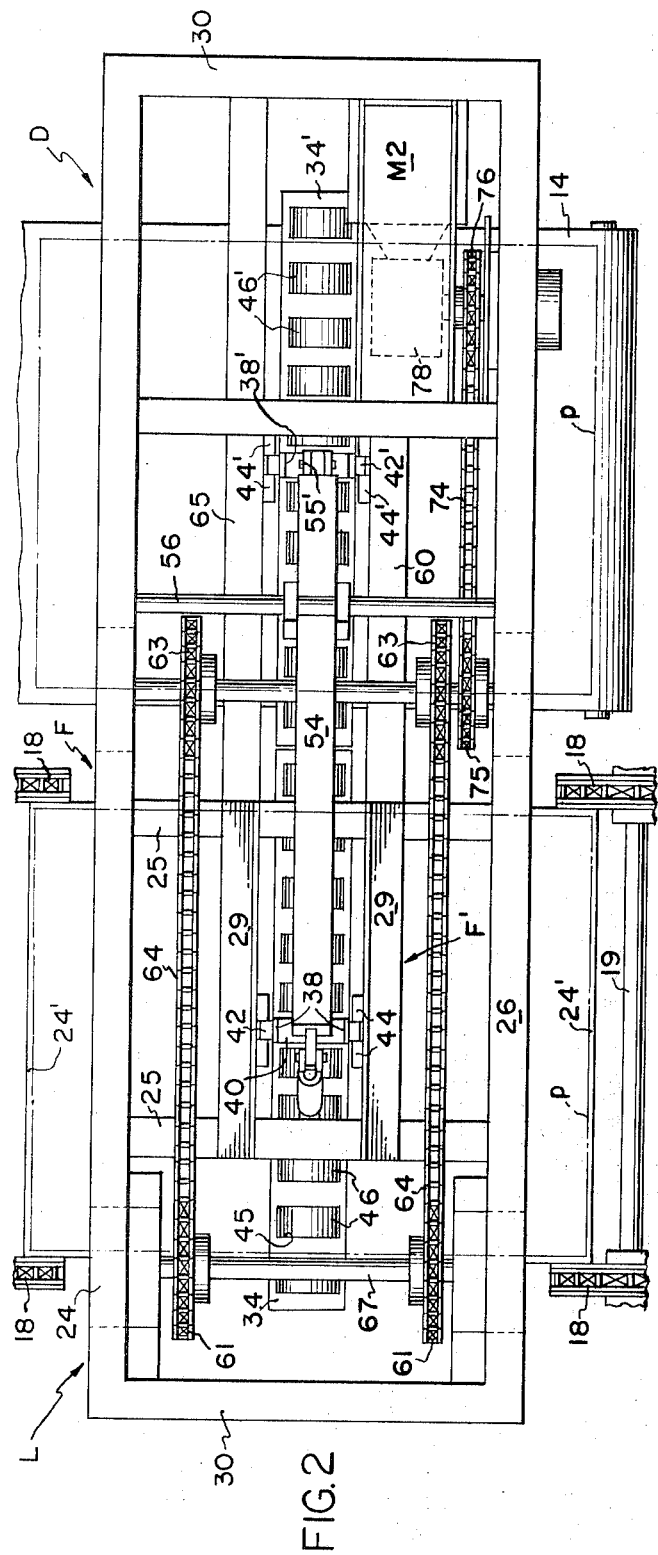

3,831,780

MAGNETIC TRANSFER APPARATUS

THE FIELD OF THE INVENTION

This invention relates to transfer apparatus, and more particularly to a magnetic pan transfer head which can be used to selectively stack or unstack magnetizable pans.

THE BACKGROUND OF THE INVENTION

In a bakery system, it is common to stack the nestable pans, which are not in use carrying bakery products, to facilitate storing them, and for this purpose, pan stacking and unstacking machines are commonly provided.

Since prior art stacking and unstacking machines are generally of dissimilar construction, a full complement of both such machines has generally been maintained by bakeries. Manufacturing savings are possible with the design of magnetic stackers and unstackers identical or substantially so. It is an object of the present invention, therefore, to provide a magnetic pan transfer head which can be utilized to either stack or unstack bakery pans, as the need arises.

It is another object of the present invention to utilize magnetic field producing means for lifting and transferring a magnetizable pan, or the like, between an article gripping station and an article depositing station.

It is a further object of the present invention to provide a vertically movable magnetic field producing head which can transfer pans laterally between pan lifting and pan depositing stations.

Other objects and advantages of the present invention will become apparent to those of ordinary skill in the art as the description thereof proceeds.

THE SUMMARY OF THE INVENTION

Apparatus for transferring magnetizeable articles, such as nested bun pans, between a pan lifting station and a pan depositing station comprising: an article support, such as a pan elevator, at the lifting station; an assembly including first vertically movable magnetic field producing means at the lifting station for successively lifting articles from the article support; mechanism for laterally transferring the lifted articles toward to the depositing station; second magnetic field producing means at said depositing station for receiving the lifted and transferred articles; and means operating the first and second magnetic field producing means for moving the first magnetic field producing means vertically toward the article support to pick up an article thereon, and for stripping another article held by the second magnetic field producing means therefrom to deposit it at the depositing station.

The present invention may more readily be described by reference to the accompanying drawings in which:

FIG. 2 is a top plan view of the apparatus illustrated in FIG. 1;

FIG. 3 is an end elevational view taken along the line 3—3 of FIG. 1;

FIG. 4 is an opposite end elevational view, taken along the line 4—4 of FIG. 1; and FIG. 5 is a schematic diagram of a typical electrical control circuit for controlling the operation of the apparatus illustrated in FIGS. 1 - 4.

THE GENERAL DESCRIPTION

Figure 1:
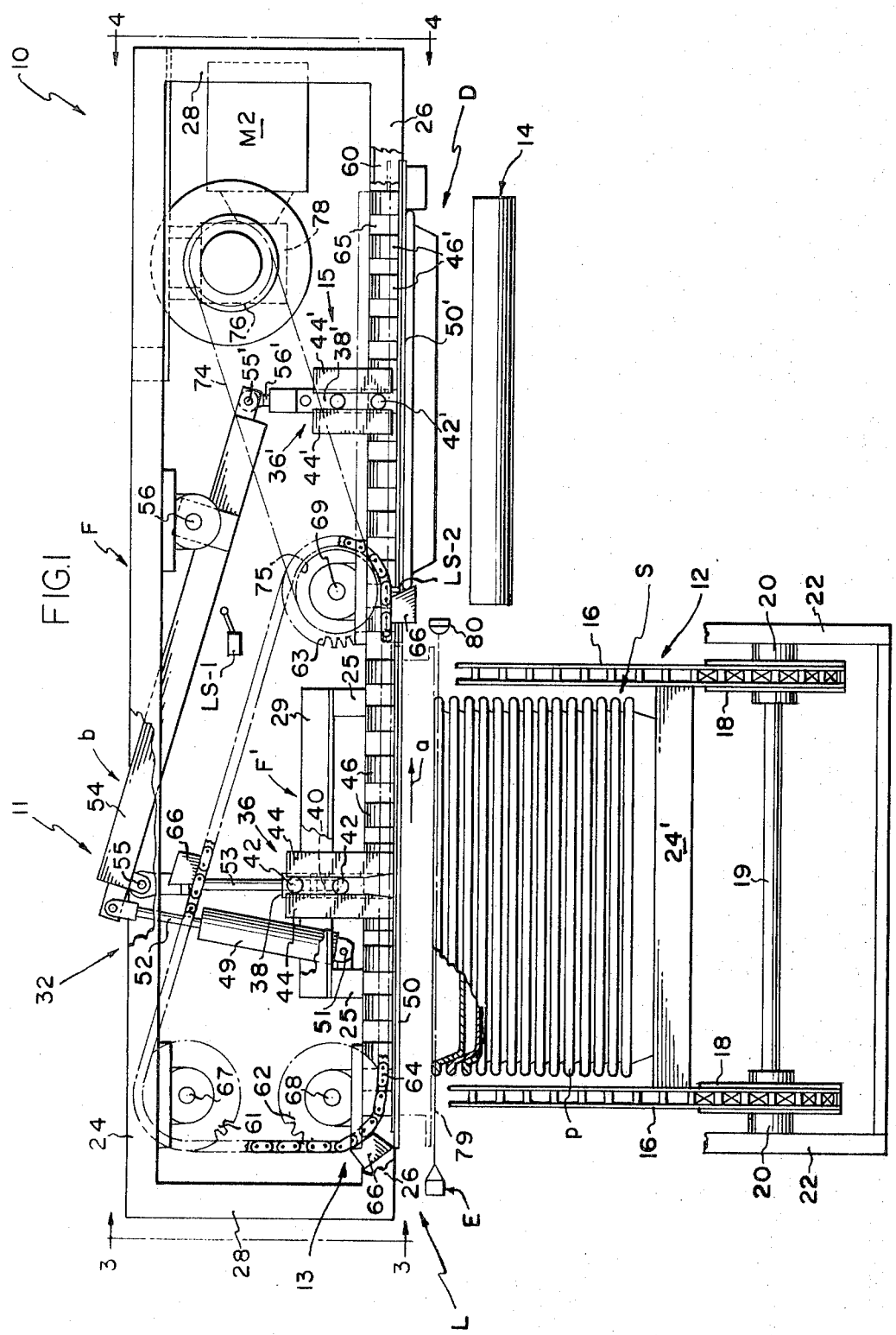
FIG. 1 is a side elevational view illustrating apparatus constructed according to the present invention, parts being broken away to more clearly illustrate other portions of the apparatus.

Transfer apparatus, generally designated 10 and constructed according to the present invention, is provided for transferring pans p from a lifting station, generally designated L, to a depositing station, generally designated D. In the apparatus illustrated, the transfer apparatus is utilized to unstack a stack S of nested pans p supported on an elevator, generally designated 12, which successively indexes the stack of pans p upwardly so that the uppermost pan is successively in position to be removed. The transfer apparatus 10 includes a lifting apparatus, generally designated 11, for successively lifting the uppermost pan from the stack to a raised position, and an endless pusher assembly 13 for pushing the lifted pans to the discharge or depositing station D, where the pans are temporarily held and then released by apparatus, generally designated 15. At the discharge station D, the pans p are deposited on a discharge conveyor, generally designated 14, which conveys the pans p to a remote location. It should be understood, of course, that instead of the elevator 12 holding a stack S of pans p, a pan supplying conveyor (not shown) could be positioned at the lift station L to sequentially deliver pans thereto, and instead of the discharge conveyor 14, a lowerator apparatus (not shown) could be substituted therefor, in which case the apparatus would function as a pan stacking device.

THE ELEVATING APPARATUS

The elevating apparatus 12 comprises pairs of endless chains 16, trained around upper and lower pairs of sprocket wheels 18 fixed to a pair of vertically spaced shafts 19 which are journaled in bearing blocks 20 supported by frame members 22 on opposite sides of the transfer apparatus 11. Pairs of horizontally aligned stack supporting platforms 24' span each pair of chains 16 and support the stack S. The shafts 19 are driven by a suitable source of power, such as an electric motor M1 (FIG. 5), to sequentially index the stack S of pans p upwardly. A photoelectric eye E is provided for controlling the operation of the motor M1 in a manner to be described more fully hereinafter in the description of the control circuit.

THE LIFTING APPARATUS

The lifting apparatus, generally designated 11, is mounted on a framework, generally designated F, which includes upper and lower pairs of side rails 24 and 26 spanning a plurality of upstanding end members 28 and a plurality of upper and lower end cross-members 30. A sub-frame generally designated F' is supported on a pair of transverse rails 25 spanning the lower side rails 26 and includes a pair of longitudinal rails 29 spanning the rails 25.

The lifting apparatus 11 includes a pickup assembly, generally designated 32, supported on the frames F and F', for raising the uppermost pan p of the stack S and includes a non-magnetic H-shaped (in end elevation) support frame, generally designated 36, having side rails 38 connected by a cross-member 40 and supporting pairs of vertically spaced follower rollers 42 received in vertical tracks defined by upstanding rails 44, fixed to longitudinal rails 29.

The H-shaped support 36 is fixed, at its lower end, intermediate the ends of a longitudinally extending non-magnetic support beam or plate 34 having a plurality of pairs of longitudinally spaced apertures 45 (FIG. 2) therein for receiving the terminal ends of a plurality of horseshoe shaped permanent magnets 46. The magnets 46 are positioned so that the same poles of all magnets are placed on the same sides of the beam 34. A pair of longitudinal magnetic rails 48 and 50 are fixed to opposite poles of the magnets 46 to provide continuous magnetic members of opposite polarity for engaging the tops of, and magnetically attracting, the magnetic pans $p$ to be raised. A link 53, fixed to the upper end of the H-shaped frame 36, is pivotally connected at 55 with a pivotal support bar 54 to be presently described.

Provided for vertically moving the magnetic rails 48 and 50 between the solid line and chain line positions, illustrated in FIG. 1, may be a double-acting, solenoid actuated, pressure fluid operated cylinder 49 which is pivotally mounted at 51 on one of the frame members 25. The lifting cylinder 50 includes a piston rod 52 pivotally connected with the support bar 54 which is fixed to a pivot shaft 56, journaled in the upper, side frame members 24. When the piston rod 52 is retracted, the bar or arm 54 is pivoted downwardly, in the direction represented by the arrow $b$, about the axis of pivot shaft 56 to lower the magnetic rails 48 and 50 from the solid line positions, illustrated in FIG. 1, to the chain line positions, also illustrated in FIG. 1, into engagement with the uppermost pan $p$. When the piston rod 52 is extended, the magnetic rails 48 and 50, which have magentically attracted the uppermost pan $p$, lift the uppermost pan $p$ to the solid line position illustrated in FIG. 1.

THE PUSHER ASSEMBLY

The pusher assembly, generally designated 13, includes pairs of upper and lower sprocket wheels 61 and 62, respectively, and a pair of lower, forwardly spaced sprockets 63, around which are trained a pair of transfer chains 64, each mounting three equidistantly spaced pan engaging paddles or lugs 66. The sprockets 61, 62 and 63 are fixed to shafts 67, 68 and 69 respectively, which are journaled in bearings provided on the side rails 24 and 26. As the chains 64 move in endless paths, the transfer lugs 66 successively move along the lower run thereof into engagement with a raised pan $p$ to move it toward the right, in the direction represented by the arrow $a$ in FIG. 1, to the depositing station, generally designated D. The chains 64 are driven by means of a chain 74 trained around a sprocket 75, fixed to the shaft 69, and the output sprocket 76 of a speed reducing unit 78 mounted on the frame F and driven by a suitable source of power such as an electric motor M2 (FIG. 1).

THE RECEIVING AND DEPOSITING APPARATUS

The receiving and holding apparatus, generally designated 15, is provided for temporarily holding a pan $p$ transferred to the depositing station D, and is constructed identically to the magnetic pickup assembly. Generally similar parts will be designated with identical reference characters followed by a prime designation.

More particularly, the holding apparatus 15 includes a pair of magnetic rails 48' and 50', fixed to the opposite poles of a plurality of permanent magnets 46' supported on a non-magnetic member 34'. A non-magnetic frame 36' is connected, at its lower end, to the midpoint of a non-magnetic plate 34' and at its upper end to a link 56' which is pivoted at 55' to the opposite end of a support bar 54. The frame 36' includes rollers 42' received in tracks defined by pairs of upstanding guide rails 44' fixed to a pair of stationary stripping rails 60 and 65 (FIG. 4), spanning the lower cross rails 25 and 30. The stripper rails 60 and 65 have wear surfaces 60a and 65a in bearing engagement with a pan $p$ being laterally transferred to the depositing station D. To facilitate the smooth, and uninterrupted transfer of pans $p$ between the lifting and depositing stations, the wear surfaces 60a and 65a of the holding apparatus 15, are at the same level as the magnetic rails 48 and 50 and either flush with or slightly below the stripping magnetic rails 50' and 48' in their lowered positions. The pan attracting magnetic force of magnets 46', in their lowered positions, will be sufficient to hold a pan against the rails 50' and 48'.

The magnetic holding rails 48' and 50' are, of course, movable upwardly between the stripping rails 60 and 65 which interrupt the upward movement of the pans $p$ with the rails 48' and 50'. As the magnetic holding rails 48' and 50' continue to move upwardly, the pan and rails 48' and 50' are relatively separated such that the pan can no longer be supported by the magnetic field of the holding magnets 46' and are thus permitted to free fall to the discharge conveyor 14.

THE CONTROL CIRCUIT

A typical control circuit for controlling the operation of the apparatus illustrated in FIGS. 1 – 3 is illustrated in FIG. 5 and includes a pair of lines L-1 and L-2 connected across a suitable source of power such as 110 volt, 60 cycle alternating current. The previously identified photoelectric eye E, mounted on one side of the elevator 12, is connected across the lines L-1 and L-2. The photoelectric eye E is operative to open contacts E1 and close contacts E2 when a light beam 79, transmitted by a light source 80, mounted on the opposite side of the elevator 12, is interrupted to indicate that a pan $p$ is in position to be lifted. The contacts E1 are connected in series circuit with a start switch 81, which may be located to be closed by a stack of pans P moving into position on elevator 12, and the elevator drive motor M1 which is deenergized to stop the upward index of the stack when the light beam 79 is interrupted. The contacts E2 are connected in series circuit with the retract solenoid 50a of the cylinder 49 for retracting the piston rod 52 to lower the lifting mechanism 11.

A limit switch LS-1 (FIG. 1) may be suitably mounted on the frame F to be actuated by the bar 54 when the lifting apparatus 11 is in the lowered position to open sets of normally closed contacts LS-1a and close sets of normally open contacts LS-1b and LS-1c. A limit switch LS-2 may be mounted on the frame F in the path of the paddles or lugs 66 at the downstream end of conveyor chains 64. The limit switch LS-2 (FIG. 1) includes a set of normally closed contacts LS-2a which are opened when a paddle 66 engages the limit switch LS-2. A parallel circuit comprising the normally closed contacts LS-2a and the normally opened contacts LS-1c is connected in series with the pusher drive motor M2. The limit switch contacts LS-1a are connected in series with the photoelectric eye contacts E2, a holding relay R, and the retract solenoid 50a. The normally open limit switch contacts LS-1b are connected in series circuit with normally closed holding relay contacts 50a1 which are opened when the solenoid 50a is energized and the advanced solenoid 50b which, when energized, will raise the lifting rails 48 and 50 to a position of horizontal alignment with the stripping rails 60 and 65.

THE OPERATION

When a stack of pans p is delivered to the elevating apparatus 12, the start switch 81 is closed to energize the elevator drive motor M1 for driving the elevator chains 16 upwardly. When the uppermost pan p interrupts the light beam 79, the contacts E1 open to deenergize the motor M1 and interrupt the upward movement of the stack S. At this same time, the contacts E2 close to energize the retract solenoid 50a and pivot the arm 54 counterclockwisely, in the direction represented by the arrow b (FIG. 1), to lower the pickup magnets 46 to the chain line position, illustrated in FIG. 1, and attract or grip the uppermost pan p of the stack S. When the arm 54 reaches the lowermost position, the limit switch LS-1 is actuated to open the normally closed contacts LS-1a and close the normally open contacts LS-1b to deenergize the solenoid 50a and energize the solenoid 50b to swing the arm 54 clockwisely, opposite the direction represented by the arrow b, to the solid line position illustrated in FIG. 1. At this same time, the normally open contacts LS-1c are closed to energize the pusher chain driving motor M2.

When the lift magnets 46 are in their raised positions, the rails 48 and 50 are flush with the stripper rails 60 and 65 to facilitate the smooth transfer of products therebetween by the pusher paddles 66. As the lift magnets 46 are returned to their raised positions, the limit switch LS-1 is disengaged to open the contacts LS-1c, but the pusher chain driving motor M2 is energized through the contacts LS-2a which close when the limit switch LS-2 is deactuated as the paddle 66 is moved out of engagement therewith.

The lugs 66 on the chains 64 engage the raised pan p and strip it from the magnetic rails 48 and 50 by pushing it toward the right into engagement with the rails 60 and 65 of the hold magnetic apparatus 15 which receive the pan and temporarily hold it in the raised position. When the lugs 66 have moved the raised pan to the depositing station D, the limit switch LS-2 will be actuated to open the normally closed contacts LS-2a to deenergize the pusher drive motor M2. After the uppermost pan p has been lifted from the stack, the eye E is unblocked to close the contacts E1 and energize the elevator indexing motor M1 which indexes the stack S upwardly. When the stack has been raised sufficiently to again interrupt the light beam 79, the contacts E1 will open and the motor M1 will be deenergized. Also, the retract solenoid 50a will again be energized to swing the arm 54 in the direction illustrated by the arrow b, to lower the magnetic rails 48 and 50 into engagement with the succeeding uppermost pan p and to simultaneously raise the magnets 48' and 50' about the pivot 56 to move the rails 48' and 50' from the solid line position, illustrated in FIG. 1 to the chain line position, also illustrated in FIG. 1. As the magnetic rails 48' and 50' move upwardly, the wear surfaces of the stripping rails 60a and 65a interrupt the upward movement of the pan p at the depositing station D and thus separate the pan at the depositing station from the magnetic rails 48' and 50' a sufficient distance so that the pan can no longer be supported by the magnetic field of the magnets 46'. The pan then free falls to the discharge conveyor 14 below. As the lifting magnetic rails 48 and 50 reach lowermost position, the limit switch LS-1 is again actuated to close the contacts LS-1b, and the operation is repeated until the stack S is unstacked.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. Apparatus for successively transferring stackable magnetic articles, such as bun pans and the like, between a lifting station and a depositing station, said apparatus comprising:

frame support means for supporting articles at a lifting station;

pickup means, including magnetic field producing means vertically movable on said frame support means between raised and lowered positions at said lifting station, for gripping a magnetic article in said lowered position and lifting it to said raised position;

means for moving said magnetic field producing means between said raised and lowered positions to move an article at said lifting station to said raised position;

horizontally movable pusher means movable in a lateral path of travel for stripping the lifted articles from the pickup means and moving them horizontally forwardly to said depositing station;

additional magnetic field producing means at said depositing station for receiving and magnetically holding said transferred article; and operating means for moving said first-mentioned magnetic field producing means toward an article on said support means to pick up an article supported thereon while simultaneously separating said additional magnetic field producing means and said transferred article held thereby to permit said article to free-fall.

2. Apparatus as set forth in claim 1 wherein said pusher means comprises endless means movable in an endless path of travel and includes pusher members thereon for engaging the lifted article and moving it forwardly; said receiving means including hold magnet means for holding the lifted products transferred to said depositing station and being connected to said pickup means for upward movement to deposit the transferred pan simultaneously with the movement of the pickup means to the lowered position to pickup a successive pan.

3. Apparatus as set forth in claim 1 wherein said magnetic field producing means includes a pair of transversely extending magnetic rails supporting a plurality of transversely spaced permanent magnets, the rails being movable into engagement with an article at said lifting station to magnetically attract and lift the article.

4. The apparatus set forth in claim 1 wherein said pusher means comprises first and second endless means on opposite sides of said magnetic field producing means, and means spanning said endless means and straddling said magnetic field producing means for engaging the raised article to strip it from the magnetic field producing means.

5. The apparatus as set forth in claim 1 wherein said operating means includes additional stripping means and means for moving one of said additional stripping means and said additional magnetic field producing means away from the other to strip the transferred article from said additional magnetic field producing means.

6. Apparatus for transferring stackable magnetic articles, such as bun pans, between a lifting station and a depositing station comprising:
  frame structure including support means for supporting articles at said lifting station;
  first and second laterally spaced magnetic field producing means; means mounting said first and second means for vertical movement in opposite directions; said first means being supported for vertical movement between a lowered position in which it magnetically attracts an article at the lifting station and a raised position in which it magnetically holds the article above the station;
  means on said frame structure for laterally transferring said raised, magnetically held article to said depositing station;
  said second magnetic field producing means being supported for vertical movement in a path of travel opposite the path of travel of said first magnetic field producing means between a lowered position in which it receives and holds articles laterally transferred to said depositing station and a raised position;
  operating means for moving said first and second magnetic field producing means in timed relation in opposite paths of travel between their respective raised and lowered positions, in timed relation with operation of said transferring means, to dispose said second magnetic field producing means in said lowered position to receive an article when said first magnetic field producing means is in said raised position and said article is transferred to said depositing station; and
  stripper means on said frame structure at a level for stripping said articles from said second magnetic field producing means when said second magnetic field producing means moves vertically to raised positon to permit said transferred articles to freefall.

7. The apparatus as set forth in claim 6 wherein said first and second magnetic field producing means respectively include first and second longitudinal, magnetic rail means which are substantially longitudinally aligned when said first and second magnetic field producing means are in said raised and lowered positions, respectively, said first and second rail means being at different vertical levels when said first and second magnetic field producing means are in said lowered and raised positions, respectively.

8. The apparatus as set forth in claim 7 wherein said stripping means includes additional longitudinal rail means positioned such that the undersides of said first magnetic rail means and said additional rail means are substantially flush with each other when said first magnetic field producing means is in said raised position and the articles can be smoothly transferred by said stripping means from said first magnetic rail means to said additional magnetic rail means to a position underlying said second magnetic rail means.

9. The apparatus set forth in claim 8 wherein said lateral transfer means includes pusher means for stripping said articles from said first magnetic field producing means and moving them forwardly to a position underlying said second magnetic field producing means.

10. The apparatus set forth in claim 9 wherein said pusher means comprises endless means having a plurality of spaced pusher plates thereon for successively engaging behind articles supported by said first magnetic field producing means and pushing them forwardly toward said second magnetic field producing means.

11. Apparatus as set forth in claim 8 wherein at least one of said magnetic field producing means comprises a pair of longitudinally extending magnetic rails and a plurality of horizontally spaced permanent magnets having opposite magnetic poles thereof adjacent opposite ones of said rails.

12. Apparatus as set forth in claim 8 wherein said first and second magnetic field producing means are movable in opposite directions between their respective raised positions and lowered positions, and operating means is provided for moving said first magnetic field producing means from a lowered position engaging an article to a raised position while moving said second magnetic field producing means between its raised and lowered positions respectively.

13. The apparatus as set forth in claim 12 wherein said first and second magnetic field producing means in said raised and lowered positions respectively are in longitudinal alignment substantially flush with each other so that articles may be smoothly transferred therebetween.

14. Apparatus as set forth in claim 6 which includes elongate mount means swingable about a pivot interjacent said first and second magnetic field producing means and mounting them at opposite ends thereof, and operating means for swinging said first and second magnetic field producing means in a to-and-fro path about said pivot means.

15. Transfer mechanism for successively transferring magnetic articles, such as bun pans, between laterally spaced pickup and despositing stations, said mechanism comprising:
  means including vertically movable magnetic field producing mechanism for successively lifting said articles at said pickup station and transferring them laterally to said depositing station;
  vertically movable magnetic field producing means for receiving and holding the lifted and transferred articles at said depositing station;
  means for simultaneously moving said magnetic field producing mechanism downwardly to attract one of said articles at said pickup station while simultaneously raising said magnetic field producing means at said depositing station; and
  means for interrupting upward movement of an article held by said magnetic field producing means so that the article and said magnetic field producing means are relatively moved to positions such that the article is no longer supported by the magnetic field of said magnetic field producing means and the article is released.

16. Apparatus for successively transferring stackable magnetic articles, such as bun pans and the like, between a lifting station and a depositing station, said apparatus comprising:

frame support means for supporting articles at a lifting station;

magnetic field producing pickup means at said lifting station for gripping a magnetic article and lifting it to a raised position;

horizontally movable pusher means movable in a lateral path of travel for stripping the lifted article from the pickup means and moving it horizontally forwardly to said depositing station;

additional magnetic field producing means vertically movable on said frame support means between a lowered position and a raised position at said depositing station for receiving and magnetically holding said transferred article when said magnetic field producing means is in said lowered position; and operating means for operating said magnetic field producing pickup means to pick up an article at said lifting station while concurrently moving said additional magnetic field producing means between said lowered and raised positions to separate said additional magnetic field producing means and said transferred article held thereby to permit said article to free-fall.

* * * * *